(12) United States Patent
Seo et al.

(10) Patent No.: US 8,594,910 B2
(45) Date of Patent: Nov. 26, 2013

(54) APPARATUS AND METHOD FOR PREVENTING INFLOW OF EXHAUST GAS OF VEHICLE

(75) Inventors: Chang Gyun Seo, Yongin-si (KR); Moo Yong Kim, Suwon-si (KR); Ho Gyu Choi, Suwon-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 13/527,121

(22) Filed: Jun. 19, 2012

(65) Prior Publication Data

US 2013/0131933 A1 May 23, 2013

(30) Foreign Application Priority Data

Nov. 23, 2011 (KR) .................. 10-2011-0122894

(51) Int. Cl.
 *B60K 13/00* (2006.01)
 *B60K 11/00* (2006.01)
(52) U.S. Cl.
 USPC ......... 701/108; 180/89.1; 180/89.2; 180/225; 180/296; 180/309
(58) Field of Classification Search
 CPC .................. B60H 1/025; B60H 2001/2281
 USPC ......... 701/108; 180/89.1, 89.2, 225, 296, 309
 See application file for complete search history.

(56) References Cited

U.S. PATENT DOCUMENTS

| 6,330,909 | B1 * | 12/2001 | Takahashi et al. | 165/202 |
|---|---|---|---|---|
| 6,685,099 | B2 * | 2/2004 | Rutyna et al. | 236/49.3 |
| 8,156,925 | B2 * | 4/2012 | Tabata | 123/568.19 |
| 2005/0194125 | A1 * | 9/2005 | Asai et al. | 165/202 |
| 2005/0210897 | A1 * | 9/2005 | Oomura et al. | 62/186 |
| 2007/0218824 | A1 * | 9/2007 | Bailey | 454/139 |
| 2009/0120063 | A1 * | 5/2009 | Uhrich et al. | 60/278 |
| 2010/0185381 | A1 * | 7/2010 | VanDyne et al. | 701/105 |

FOREIGN PATENT DOCUMENTS

| JP | 2005-22433 A | 1/2005 |
|---|---|---|
| JP | 2006-193116 A | 7/2006 |

* cited by examiner

*Primary Examiner* — Mary Cheung
*Assistant Examiner* — Atul Trivedi
(74) *Attorney, Agent, or Firm* — Morgan, Lewis & Bockius LLP

(57) ABSTRACT

Provided are an apparatus and method for preventing the inflow of exhaust gas of a vehicle. The apparatus includes a mode door provided in an air conditioner of a vehicle in such a manner as to close an air inlet, being in air-close mode, so that only inside air is circulated, or to open the air inlet, being in air-open mode, so that outer air is introduced, and a controller designed, in the air-close mode and above a certain vehicle speed, to control the mode door to tilt and open at a certain angle towards the air-open mode.

11 Claims, 6 Drawing Sheets

APPARATUS AND METHOD FOR PREVENTING INFLOW OF EXHAUST GAS OF VEHICLE

CROSS-REFERENCE TO RELATED APPLICATIONS

The present application claims priority of Korean Patent Application Number 10-2011-0122894 filed Nov. 23, 2011, the entire contents of which application is incorporated herein for all purposes by this reference.

BACKGROUND OF INVENTION

1. Field of Invention

The present invention relates, in general, to an apparatus and method for preventing the inflow of the exhaust gas of a vehicle, and in particular, to an apparatus and method for preventing exhaust gas from being reintroduced into the vehicle at a reduced pressure, which takes place inside of the vehicle when the vehicle is traveling.

2. Description of Related Art

Generally, the inside of a vehicle is fundamentally designed and manufactured to be airtight using a weather strip, a seal, etc. However, because of manufacturing error or tolerance, gaps exists in between components of vehicles. Thus, air inevitably flows through these gaps to the inside of a vehicle to some extent, which may cause the phenomenon of the reintroduction of exhaust gas.

Specifically, when a vehicle travels at high speed as shown in FIG. 1, the outside air speed related to the vehicle increases considerably and the pressure drops, so the inside air of a vehicle is strongly inclined to escape to the outside where there is low pressure.

When air escapes from the inside of the vehicle through a fine gap, exhaust gas being exhausted from the rear of the vehicle may be reintroduced into the inside of the vehicle through gaps in the trunk or in the undersurface of a vehicle body while staying at the rear of the vehicle due to an eddy phenomenon.

This phenomenon is generally assumed to be caused by a difference in pressure between the inside and outside of the vehicle. Here, if an air conditioner of a vehicle is in air-open mode wherein the outer air is introduced into the inside of the vehicle, the outside air compensates for the reduction of pressure in the inside of the vehicle, resulting in less or no introduction of exhaust gas.

However, if the air conditioner is in air-close mode, the air escaped from the inside of the vehicle is not compensated, essentially causing a reduction in the inside pressure, which may result in the introduction of exhaust gas. This phenomenon becomes severe at high speeds, because the higher the vehicle speed is, the larger the pressure difference is between the inside and outside of the vehicle.

Therefore, there is a need to effectively prevent the exhaust gas from flowing in and keep the inside air pleasant without the addition of a specific construction that may increase the costs.

Some technologies have been proposed in which a mode door is partially opened such that outside air is partially introduced and is mixed with the inside door in order to improve the efficiency of an air conditioner. However, unlike the conventionally technologies, the present application aims at keeping the inside pressure constant irrespective of the operation of the air conditioner by minimally regulating a tilt angle of a mode door. This concept has not yet been disclosed in the related art.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present application has been made keeping in mind the above problems occurring in the related art, and various aspects of the present invention provide for an apparatus and method for preventing the inflow of exhaust gas. In a case of a vehicle traveling at high speed, even when an air conditioner is in air-close mode, the inside pressure is maintained to prevent pressure reduction and essentially block an inflow of exhaust gas.

Various aspects of the present invention provide for an apparatus for preventing the inflow of the exhaust gas of a vehicle. The apparatus includes: a mode door provided in an air conditioner of the vehicle to close an air inlet, being in an air-close mode, so that inside air is circulated, or to open the air inlet, being in an air-open mode, so that outer air is introduced into an inside of the vehicle; and a controller designed to control the mode door, wherein the controller tilts and opens the mode door to an angle towards the air-open mode, when the mode door is in the air-close mode and a vehicle speed is a predetermined vehicle speed or higher, thereby preventing reintroduction of exhaust gas due to a drop in inside pressure and minimizing a decrease in air-conditioning performance.

The mode door may be mounted below a front cowl panel of the vehicle, and is of a rotary type door rotated by a motor.

The controller may operate in such a manner as to tilt the mode door to the angle towards the air-open mode when the vehicle speed is a second vehicle speed or higher, and releases a tilted state of the mode door when the vehicle speed drops below a first vehicle speed. The controller is designed, in a tilted state of the mode door, to further tilt the mode door to another angle towards the air-open mode when an opening of the vehicle is opened or tilted, wherein the opening includes a window or a sunroof of the vehicle. The controller determines the angle of the mode door according to the vehicle speed when the vehicle speed is the predetermined vehicle speed or higher. The controller repeats tilting and releasing of the mode door with a periodic cycle when the vehicle speed is the predetermined vehicle or higher.

Various aspects of the present invention provide for an apparatus for preventing the inflow of the exhaust gas of a vehicle. The apparatus may include a mode door provided in an air conditioner of the vehicle to close an air inlet, being in an air-close mode, so that inside air is circulated, or to open the air inlet, being in an air-open mode, so that outer air is introduced into an inside of the vehicle; and a controller designed to control the mode door, wherein the control tilts and opens the mode door to an angle towards the air-open mode when the mode door is in the air-close and an opening of the vehicle is opened or tilted, thereby preventing reintroduction of exhaust gas due to a drop in inside pressure and minimizing a decrease in air-conditioning performance, wherein the opening includes a window or a sunroof of the vehicle.

Various aspects of the present invention provide for a method for preventing the inflow of the exhaust gas. The method includes: determining whether a mode door provided in an air conditioner of a vehicle is in an air-close mode; determining whether a vehicle speed is a predetermined vehicle speed or higher; and if the mode door is in the air-close mode and the vehicle speed is the predetermined vehicle speed or higher, tilting and opening the mode door at an angle towards the air-open mode.

The tilting may be carried out when the vehicle speed is a second vehicle speed or higher, and when the vehicle speed drops below a first speed, a tilted state of the door mode is released. The tilting may include tilting the mode door, which is in a tilted state, to another angle towards the air-open mode when an opening of the vehicle is opened or tilted, wherein the opening includes a window or a sunroof of the vehicle.

Various aspects of the present invention provide for a method of preventing the inflow of the exhaust gas. The method includes: determining whether a mode door provided in an air conditioner of the vehicle is in an air-close mode; determining whether an opening of the vehicle is opened or tilted, wherein the opening includes a window or a sunroof of the vehicle; and if the mode door is in the air-close mode and the vehicle speed is a predetermined vehicle speed or higher, tilting and opening the door mode to an angle towards the air-open mode.

Various aspects of the present invention provide for an apparatus and method for preventing the inflow of the exhaust gas of a vehicle, even when the mode door is in air-close mode and the vehicle is traveling at high speed, a small quantity of outside air is introduced into the inside of the vehicle so that the inside pressure is kept substantially constant, thereby preventing the inflow of the exhaust gas. Thereby, the efficiency of the air conditioner is not substantially reduced, and the driving comfort can be additionally improved by preventing the occurrence of tinnitus and other uncomfortable conditions due to the pressure difference when traveling at high speed.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
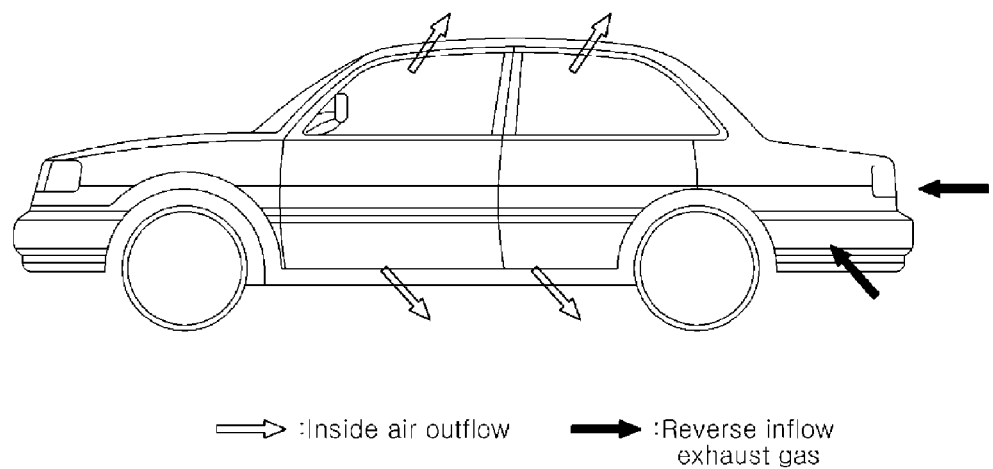
FIG. 1 shows a phenomenon of the re-inflow of the exhaust gas of a vehicle.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Wherever possible, the same reference numerals will be used throughout the drawings and the description to refer to the same or like parts.

Figure 2:
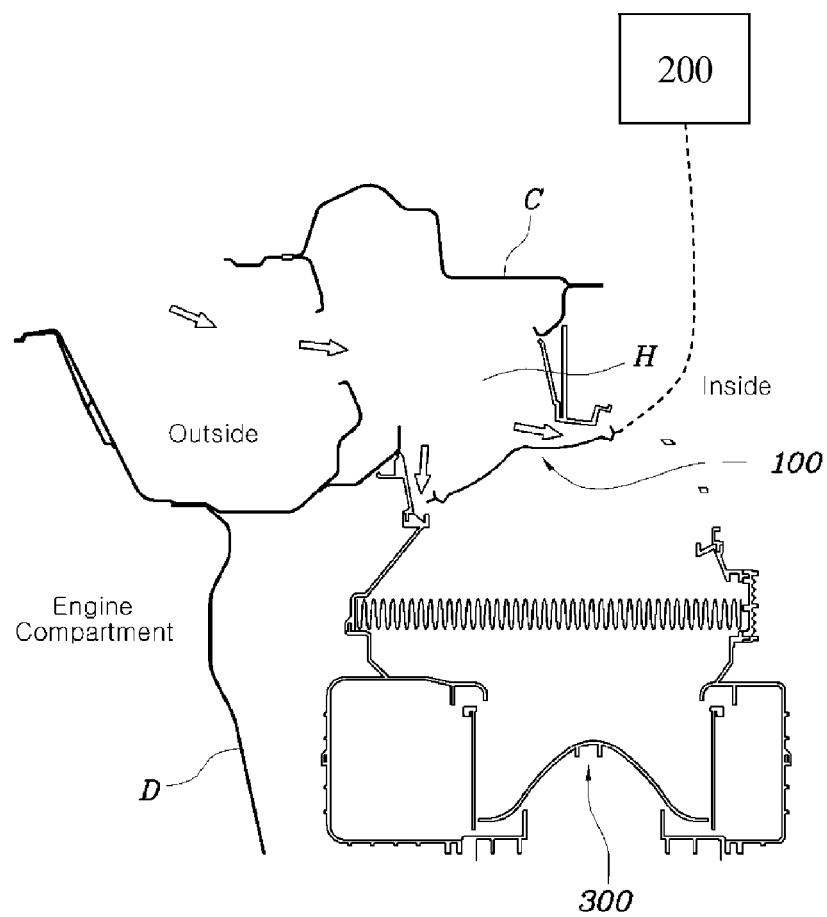
FIG. 2 illustrates an exemplary apparatus for preventing the inflow of the exhaust gas of a vehicle according to the present application.

Referring to FIG. 2, the apparatus includes a mode door 100 and a controller 200. The mode door 100 is provided in an air conditioner of a vehicle in such a manner as to close an air inlet H, being in air-close mode, so that only inside air is circulated, or to open the air inlet H, being in air-open mode, so that outer air is introduced. The controller 200 is designed, in the air-close mode and above a certain vehicle speed, to control the mode door 100 to tilt and open at a certain angle towards the air-open mode, thereby preventing the reintroduction of exhaust gas due to the drop in the inside pressure, and minimizing the decrease in air-conditioning performance.

As shown in the figure, an air conditioner of a common passenger car is provided with the mode door 100 which blocks air inlets H. The air inlets H are respectively provided below a cowl panel C and above a dash panel D. The mode door 100 is generally configured in such a manner as to selectively open and close the air inlets H as it rotates, so that a blower 300 located below the mode door can introduce the outside air into the inside, or circulate the inside air.

The edge of the mode door 100 is sealed to increase the air-conditioning efficiency of the air conditioner, so that if the mode door 100 is in air-close mode in which the air inlet H is closed as shown in the figure, it is difficult for the outside air to be introduced into the inside from the outside.

The mode door 100 is mounted below a front cowl panel C of a vehicle and is of a rotary type which is rotated by a motor. The motor is generally controlled by the controller so as to open and close the mode door.

The controller collects information about signals indicating the operation state of the mode door 100 and about the vehicle speed, and determines whether to tilt the mode door 100 or not, using the collected information.

Specifically, when the mode door 100 is in air-close mode in which the outside air cannot be introduced, and the vehicle speed is a certain speed or higher, the inside pressure is inclined to decrease, so that the controller controls the mode door 100 to tilt and open at a certain angle towards the air-open mode, thereby preventing the re-inflow of the exhaust gas due to the drop in the inside pressure, and minimizing the decrease in air-conditioning performance.

That is, when the mode door 100 is tilted at a very small angle and partially opened, outside air will be introduced into the inside to compensate for the reduced inside pressure, so that the inside air and outside air mix with each other in the blower 300, which in turn supplies the mixed air into the inside. With this operation, the inside air has substantially constant pressure, even if a vehicle travels at high speed so that the outside pressure instantaneously decreases, the inside air is not evacuated out of the inside, or otherwise even if it is evacuated, the outside air is introduced into the inside and compensates for the reduced inside pressure, thereby keeping the inside pressure substantially constant.

This eventually prevents the exhaust gas from flowing back into the inside. This also provides an additional effect of improving the driving comfort by maintaining a substantially constant inside pressure and thus eliminating tinnitus and other uncomfortable phenomena.

The tilting of the mode door 100 has a great effect on controlling the inside pressure with a small amount of tilting. The minor amount of tilting or opening of the mode door minimizes the decrease in the efficiency of the air conditioner. It is believed that the inside pressure is greatly improved just by approximately 2° of tilting.

The object and construction of the technology of the related art in which there is no concept of tilting of the mode door 100 for preventing the inflow of exhaust gas and in which the mode door is partially opened so that the inside air and outside air are introduced together so as to improve the efficiency of the air conditioner is different from the present technology. Particularly, the present application is not associated with the inside temperature or the operation of the air conditioner, and performs control action on the inside pressure in order to protect passenger's respiratory organs as well as to maintain driving comfort.

The controller may be configured to operate in such a manner as to tilt the mode door 100 at a certain angle towards air-open mode when the vehicle speed is a second vehicle speed or higher, and to release the tilted state of the mode door 100 when the vehicle speed drops below a first vehicle speed. That is, if only a single speed reference is taken into account, there is a risk of the mode door 100 vibrating near the corresponding speed. If the controller makes reference to the speed divided into a tilting speed and a tilting-releasing speed, it can reliably prevent the vibration of the mode door 100 with the establishment of hysteresis.

In addition, the controller may be designed, in a tilted state of the mode door 100, to further tilt the mode door 100 at a certain angle towards the air-open mode when an opening, such as a window or a sunroof of a vehicle, is opened or tilted. For example, the mode door may be first tilted by approximately 2°, and further tilted by approximately 1~2°, resulting in the formation of a total 3~4° tilting angle.

Here, since when the opening or tilting of the opening, such as a window being partially opened or a sunroof being tilted, is performed, there is possibility that the inside air is evacuated to the outside which is at low pressure. In this case, the mode door 100 is further tilted so that the reduced inside pressure is compensated more rapidly.

In addition, the opening in the opened state reflects the passenger's intention of further trying to expose oneself to the outside air, so that it is associated with the passenger's driving comfort. While upon partial opening or tilting of the opening, the inside air is also evacuated to the outside despite the intent of the passenger, which may be assumed to indicate the passenger's intention to introduce the outside air.

Further, the controller controls a tilted angle of the mode door 100 according to the vehicle speed when the vehicle speed is the certain speed or higher, so as to introduce the outside air in correspondence with the vehicle speed, thereby minimizing the decrease in the efficiency of the air conditioner or the passenger's driving comfort. For example, the controller may control the tilted angle stepwise in association with the vehicle speed, set the range of vehicle speed according to angle levels such as approximately 2°, 4°, and 6°, and increase or decrease the tilted angle of the mode door in a stepwise manner according to the range.

Further, the controller repeats tilting and releasing of the mode door 100 with a periodic cycle when the vehicle speed is the certain speed or higher, thereby preventing the problem that may occur in a severe cold or hot area when the outside air is continuously introduced.

Figure 3:
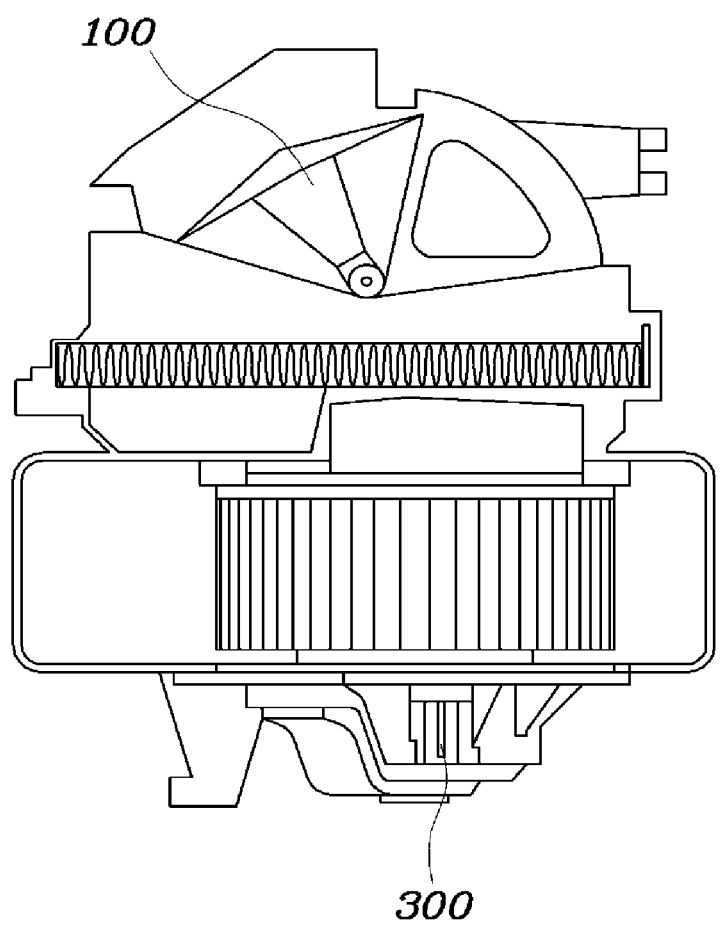
FIGS. 3, 4 and 5 depict the operation of a mode door of the apparatus shown in FIG. 2.
Figure 4:
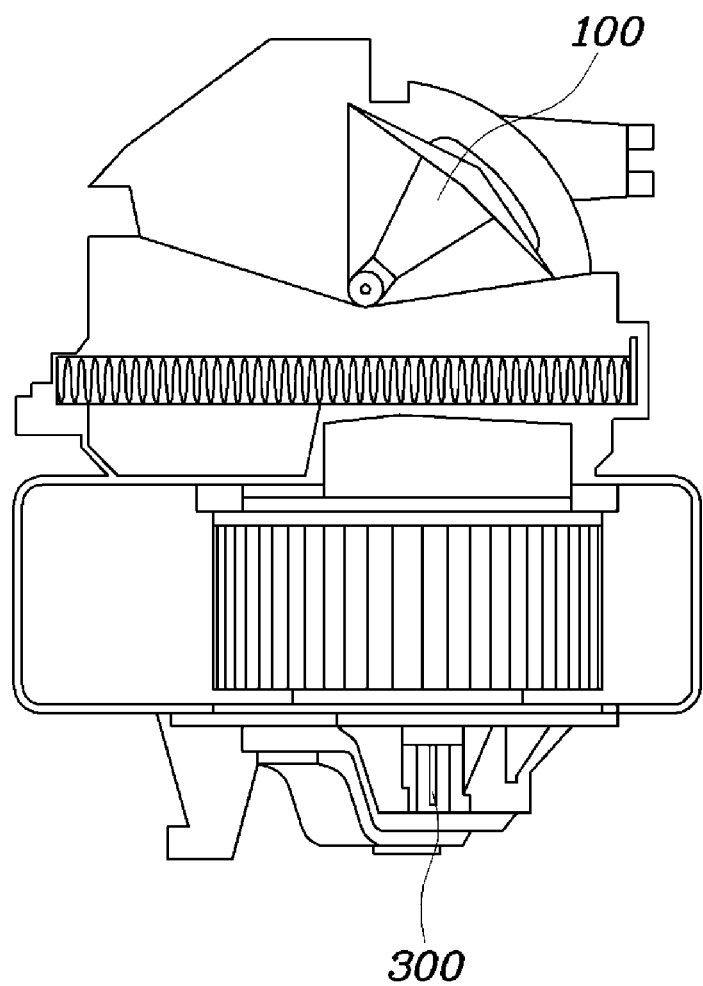
Figure 5:
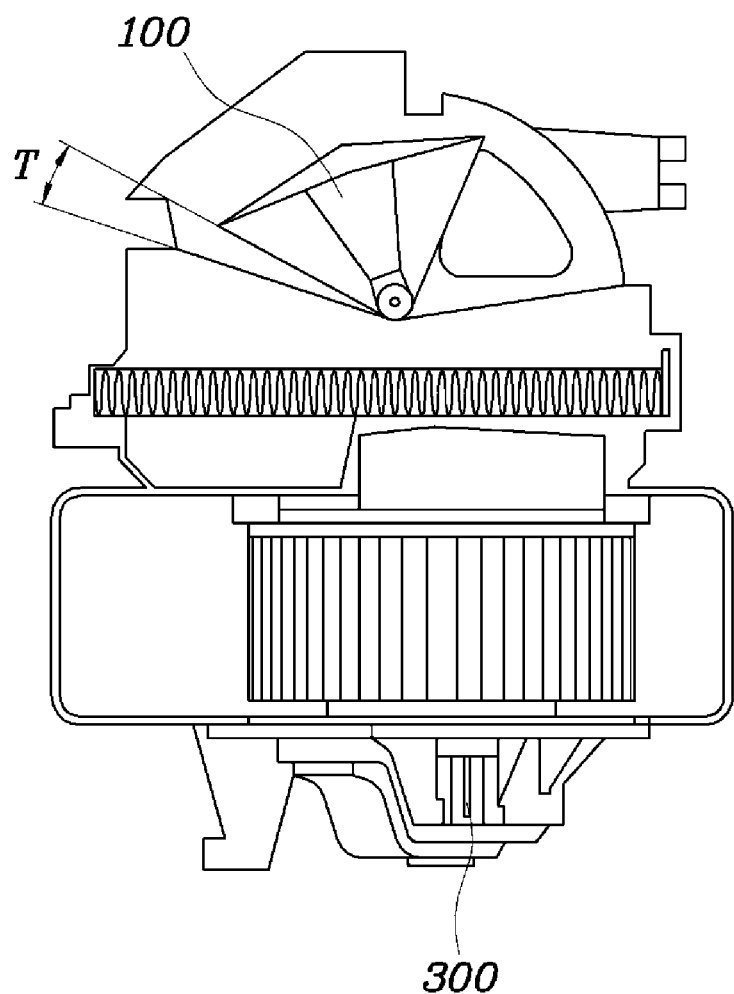

FIGS. 3 to 5 depict the operation of the mode door of the apparatus shown in FIG. 2. FIG. 3 shows the air-close mode of the mode door by which the outside air is not introduced into the inside. FIG. 4 shows the air-open mode of the mode door by which the outside air is introduced into the inside.

While in the air-open mode of FIG. 4, there is no risk of inside pressure being reduced, in the air-close mode of FIG. 3, the inside pressure may be substantially reduced when the vehicle speed is high. In this case, if the mode door is finely tilted upwards at a certain angle as shown in FIG. 5, the outside air is introduced into the inside and compensates for the reduced inside pressure, thereby preventing the inflow of the exhaust gas from the rear side of the vehicle.

In various embodiments, the present application provides an apparatus for preventing the inflow of the exhaust gas of a vehicle. The apparatus includes a mode door 100 and a controller 200. The mode door 100 is provided in an air conditioner of a vehicle in such a manner as to close an air inlet, being in air-close mode, so that only inside air is circulated, or to open the air inlet, being in air-open mode, so that outer air is introduced. The controller 200 is designed, in the air-close mode, to control the mode door 100 to tilt and open at a certain tilt angle towards the air-open mode when an opening, including a window or sunroof of a vehicle, is opened or tilted, thereby preventing the reintroduction of exhaust gas due to the drop in the inside pressure, and minimizing a decrease in air-conditioning performance. That is, when an opening of the vehicle is opened or tilted irrespectively of the vehicle speed, the inside air is evacuated easily at lower vehicle speeds. In addition, the mode door 100 can be effectively tilted irrespective of the vehicle speed.

In the meantime, in accordance with another aspect, the present application provides a method of preventing the inflow of exhaust gas. The method includes checking whether the mode door of an air conditioner of a vehicle is in air-close mode or not (S100), checking whether a vehicle speed is a certain speed or higher (S200). If the mode door is in the air-close close mode and the vehicle speed is the certain speed or higher, tilting and opening the door mode at a certain angle towards the air-open mode (S400).

The tilting (S400) is carried out such that when the vehicle speed is a second speed or higher, the mode door is tilted at the certain angle towards the air-open mode, and when the speed drops below a first speed, the tilted state of the door mode is released. In various embodiments, the tilting (S400) includes further tilting the mode door to another certain angle towards the air-open mode when the opening, including a window or sunroof of a vehicle, is opened or tilted in a tilted state of the mode door.

Figure 6:
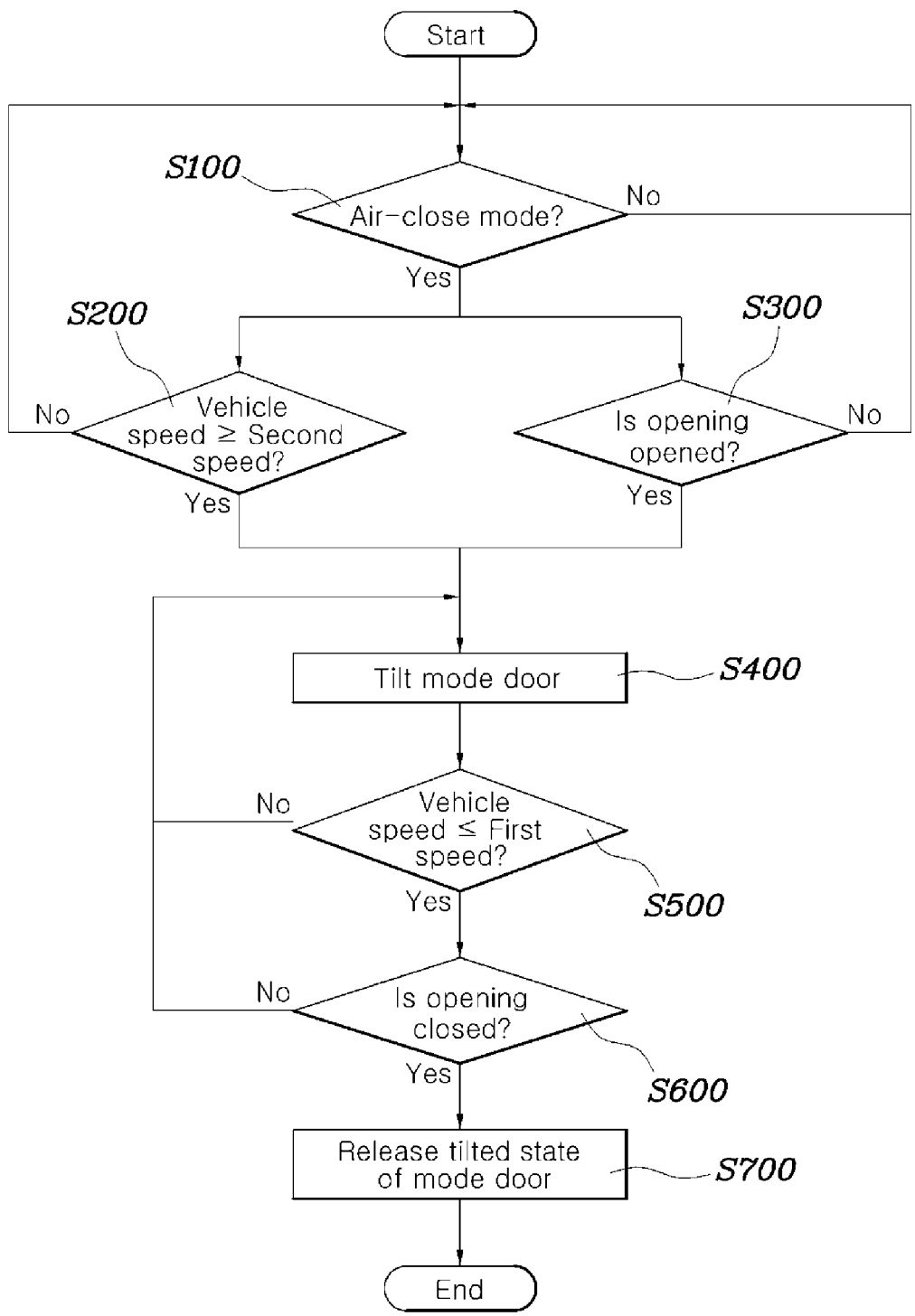
FIG. 6 is a flow chart illustrating a procedure of an exemplary method for preventing the inflow of the exhaust gas of a vehicle according to the present application.

FIG. 6 is a flow chart illustrating a procedure of a method for preventing the inflow of the exhaust gas of a vehicle according to various embodiments of the present application. Referring to FIG. 6, it is first checked whether a mode door is in air-close mode or not. If the mode door is in air-close mode, the mode door is tilted when the vehicle speed is a second speed or higher. Further, when an opening is opened irrespective of the vehicle speed, the mode door is controlled to tilt.

When the vehicle speed drops below the first speed, and the opening is closed, the tilted state of the mode door is released. In this state, when the mode door is still set to the air-close mode, it enters air-close mode again. That is, in the released state, the mode state returns to the original mode of the mode door. When the mode door switches to the air-open mode during tilting of the mode door, the tilted state of the mode door is released, allowing the mode door to be completely opened. Since there is no loss of inside pressure in the air-close mode, it is unnecessary to oppose this manipulation.

In the meantime, in various embodiments, the present application provides a method of preventing the inflow of the exhaust gas. The method includes checking whether a mode door of an air conditioner of a vehicle is in air-close mode or not (S100), checking whether an opening, including a window or sunroof of a vehicle, is opened or tilted (S300). If the mode door is in air-close mode and the vehicle speed is the certain speed or higher, tilting and opening the door mode at a certain angle towards the air-open mode (S400). This method independently controls the mode door when an opening has been opened. The method can be implemented similarly as described before, so the detailed description thereof will be omitted.

According to the apparatus and method of the present application for preventing the inflow of the exhaust gas of a vehicle, even when the mode door is in air-close mode and the vehicle travels at high speed, a small quantity of outside air is introduced so that the inside pressure is kept substantially constant, thereby preventing the inflow of exhaust gas. Thereby, the efficiency of the air conditioner is not substantially reduced, and the driving comfort can be additionally improved by preventing the occurrence of tinnitus and other uncomfortable conditions due to a pressure difference.

For convenience in explanation and accurate definition in the appended claims, the terms "upper" or "lower", "front" or "rear", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for preventing an inflow of exhaust gas of a vehicle, the apparatus comprising:
    a mode door provided in an air conditioner of the vehicle to close an air inlet, being in an air-close mode, so that inside air is circulated, or to open the air inlet, being in an air-open mode, so that outer air is introduced into an inside of the vehicle; and
    a controller designed to control the mode door, wherein the controller tilts and opens the mode door to an angle towards the air-open mode to adjust an inside pressure of the vehicle, when the mode door is in the air-close mode and a vehicle speed is a predetermined vehicle speed or higher, thereby maintaining a substantially constant inside pressure and preventing reverse introduction of exhaust gas due to a drop in the inside pressure of the vehicle and minimizing a decrease in air-conditioning performance.

2. The apparatus according to claim 1, wherein the mode door is mounted below a front cowl panel of the vehicle, and is of a rotary type door rotated by a motor.

3. The apparatus according to claim 1, wherein the controller tilts the mode door to the angle towards the air-open mode when the vehicle speed is a second vehicle speed or higher, and releases a tilted state of the mode door when the vehicle speed drops below a first vehicle speed.

4. The apparatus according to claim 1, wherein the controller further tilts the mode door, which is in a tilted state, to another angle towards the air-open mode when an opening of the vehicle is opened or tilted, wherein the opening includes a window or a sunroof of the vehicle.

5. The apparatus according to claim 1, wherein the controller controls a tilted angle of the mode door according to the vehicle speed when the vehicle speed is the predetermined vehicle speed or higher.

6. The apparatus according to claim 1, wherein the controller repeats tilting and releasing of the mode door with a periodic cycle when the vehicle speed is the predetermined vehicle or higher.

7. An apparatus for preventing an inflow of exhaust gas of a vehicle, the apparatus comprising:
    a mode door provided in an air conditioner of the vehicle to close an air inlet, being in an air-close mode, so that inside air is circulated, or to open the air inlet, being in an air-open mode, so that outer air is introduced into an inside of the vehicle; and
    a controller designed to control the mode door, wherein the controller tilts and opens the mode door to an angle towards the air-open mode to adjust an inside pressure of the vehicle, when the mode door is in the air-close and an opening of the vehicle is opened or tilted, thereby maintaining a substantially constant inside pressure and preventing reverse introduction of exhaust gas due to a drop in the inside pressure of the vehicle and minimizing a decrease in air-conditioning performance, wherein the opening includes a window or a sunroof of the vehicle.

8. A method for preventing an inflow of exhaust gas of a vehicle, the method comprising:
    determining whether a mode door provided in an air conditioner of a vehicle is in an air-close mode;
    determining whether a vehicle speed is a predetermined vehicle speed or higher; and
    if the mode door is in the air-close mode and the vehicle speed is the predetermined vehicle speed or higher, tilting and opening the mode door to an angle towards the air-open mode to adjust an inside pressure of the vehicle in order to maintain a substantially constant inside pressure and prevent reverse introduction of exhaust gas due to a drop in the inside pressure of the vehicle.

9. The method according to claim 8, wherein the tilting is carried out when the vehicle speed is a second vehicle speed or higher, and when the vehicle speed drops below a first speed, a tilted state of the door mode is released.

10. The method according to claim 8, wherein the tilting further comprises tilting the mode door, which is in a tilted state, to another angle towards the air-open mode when an opening of the vehicle is opened or tilted, wherein the opening includes a window or a sunroof of the vehicle.

11. A method of preventing an inflow of exhaust gas of a vehicle, the method comprising:
    determining whether a mode door provided in an air conditioner of the vehicle is in an air-close mode;
    determining whether an opening of the vehicle is opened or tilted, wherein the opening includes a window or a sunroof of the vehicle; and
    if the mode door is in the air-close mode and the vehicle speed is a predetermined vehicle speed or higher, tilting and opening the door mode to an angle towards the air-open mode to adjust an inside pressure of the vehicle in order to maintain a substantially constant inside pressure and prevent reverse introduction of exhaust gas due to a drop in the inside pressure of the vehicle.

* * * * *